United States Patent [19]
Kai

[11] Patent Number: 6,063,153
[45] Date of Patent: May 16, 2000

[54] VENT STRUCTURE OF A MOTOR

[75] Inventor: Shigeru Kai, Saitama, Japan

[73] Assignee: Showa Corporation, Saitama, Japan

[21] Appl. No.: 09/133,088

[22] Filed: Aug. 12, 1998

[30]   Foreign Application Priority Data

Aug. 26, 1997   [JP]   Japan ................................ 9-243541

[51] Int. Cl.$^7$ .................................................. B01D 71/36
[52] U.S. Cl. ........................... 55/385.4; 55/385.1; 96/13; 96/14; 96/134
[58] Field of Search ................ 55/385.1, 385.4; 96/13, 14, 134, 223

[56]            References Cited

U.S. PATENT DOCUMENTS

| 4,227,527 | 10/1980 | De Frank et al. ................... 96/223 |
| 4,957,522 | 9/1990 | Brassell .................................. 55/385.4 |
| 5,342,434 | 8/1994 | Wu ............................................. 96/14 |
| 5,353,949 | 10/1994 | Seibert et al. ....................... 55/385.1 |
| 5,462,586 | 10/1995 | Sugiyama et al. ...................... 96/13 |
| 5,891,223 | 4/1999 | Shaw et al. ............................ 96/134 |
| 5,914,415 | 6/1999 | Tago ..................................... 55/385.1 |

*Primary Examiner*—David A. Simmons
*Assistant Examiner*—Minh-Chau T. Pham
*Attorney, Agent, or Firm*—Dvorak & Orum

[57]                 ABSTRACT

Watertight sealed type electric motor 10, with a clearance between a core wire and a cover 24 of a lead wire 20, which is a vent path between the interior of the motor 10 and the outside, which clearance is covered a vent filter 28, which permits only gas to pass therethrough, and is attached to the lead wire 20 so as to cover an opening end portion of the cover 24.

4 Claims, 4 Drawing Sheets

6,063,153

VENT STRUCTURE OF A MOTOR

BACKGROUND OF THE INVENTION

1. Field of the Invention

The present invention relates to a vent structure of a motor, in particular, a closed type electric motor.

2. Description of the Related Art

In general, a motor used above water is a sealed type motor constructed to be watertight. In such a motor, a motor case is heated by a heat generated by rotation of an armature. At this time, thermally expanded air in the motor case passes through a clearance 4 between a core wire 2 of a lead wire 1 and and a cover 3 thereof shown in prior art FIG. 5 and FIG. 6, and then, is discharged outside via an opening end portion 3A of the cover 3. On the other hand, when the interior of the motor case is to be cooled, air is sucked into the motor case from the opening end portion 3A of the cover 3 of the lead wire 1 through the clearance 4 (first prior art).

There is another known sealed type motor which is constructed in a manner that the opening end portion 3A of the cover 3 of the lead wire 1 is sealed or molded with the use of a bonding agent so as to fully watertightly and airtightly seal between the interior of the motor and the outside (second prior art).

The aforesaid sealed type motor of the first prior art has the following problems. Specifically, water adheres to a terminal 5 which is fixed to an end portion of the core wire 2 of the lead wire 1 by pressing, and when an atmospheric moisture is high, a water vapor is condensed into water in the clearance 4 between the core wire 2 of the lead wire 1 and the cover 3 thereof; as a result, the water adheres thereto. The water is sucked into the motor case together with the air, and then, is collected therein; as a result, the water contacts the armature and the brushes of the motor. Thereafter, due to the influence of water, copper of the armature is precipitated onto the brushes by electrolysis. As a result, the armature and the brushes are damaged; for this reason, there is the possibility that a abnormal abrasion, and wear is caused between the armature and brushes.

In the sealed type motor of the second prior art, moisture and air do not flow into the interior of the motor case and flow out therefrom; for this reason, the motor case has an absence of moisture and oxygen. As a result, there is the possibility that abnormal dust abrasion is caused between the commutator and the brushes.

In the aforesaid sealed type motor of the second prior art, in order to prevent the aforesaid dust abrasion, electric graphite is used for the brushes, and there has been proposed brushes made of a material impregnated non-hygroscopic metallic halogen salt. However, these materials increase the cost of construction.

SUMMARY OF THE INVENTION

The present invention has been made in view of the aforesaid problems with the prior art. It is, therefore, an object of the present invention to provide a vent structure of a motor, which can prevent abnormal abrasion between a commutator and the brushes.

To achieve this abject, the present invention provides a watertight sealed type motor, which is provided with a vent filter capable of passing only gas in a manner of a cover vent path permitting a passage of gas between an interior of the motor and the outside.

BRIEF DESCRIPTION OF THE DRAWINGS

The present invention will be understood more fully from the detailed description given herein and from the accompanying drawings of the preferred embodiments of the invention.

In the drawings.

DESCRIPTION OF THE PREFERRED ENBODIMENTS

Figure 1:
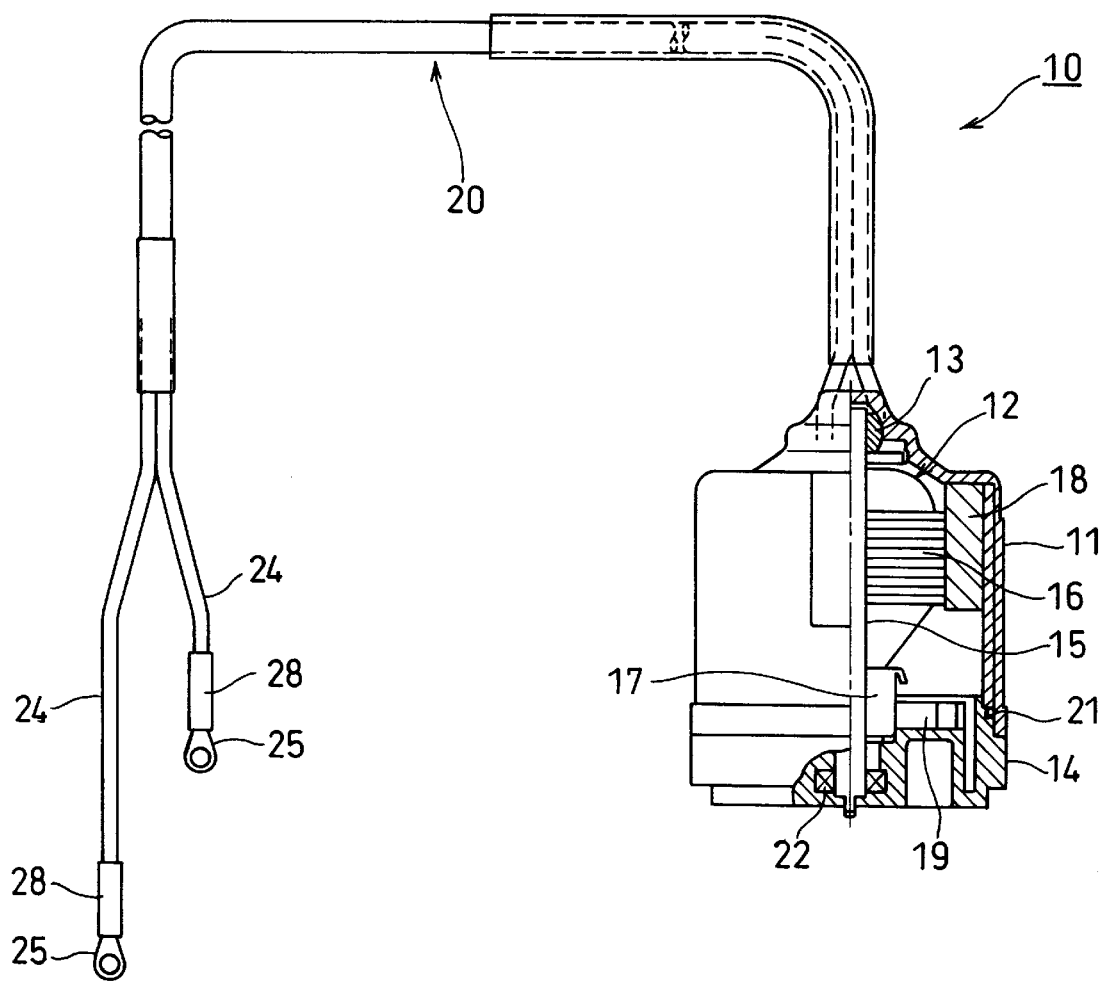
FIG. 1 is a partially broken front view showing a motor to which a vent structure according to the first embodiment of the present invention is applied.
Figure 2:
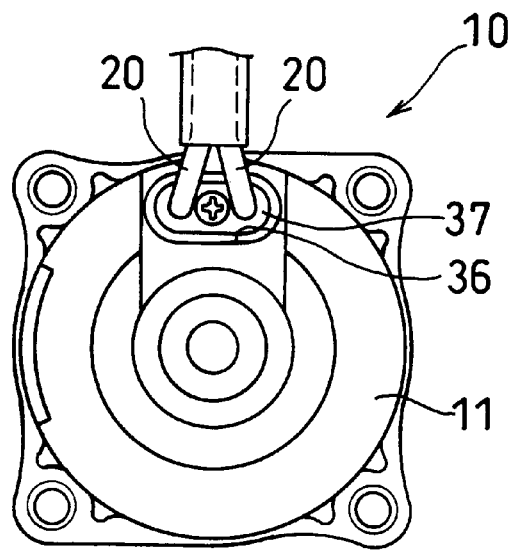
FIG. 2 is a top plan view of the motor shown in FIG. 1.

A motor 10 shown in FIG. 1 and FIG. 2 is a sealed type motor having a watertight structure, for use above water. A motor case 11 is provided with a armature 12. The armature 12 is rotatably supported by a bearing 13 located on a closed-side end portion of the motor case 11, and an end plate 14 located on an opening-side end portion of the motor case 11 so as to close the opening.

The armature 12 is constructed in a manner that a coil 16 is wound around an iron shaft 15, and a commutator segment 17 suitably insulated is located coaxially with the shaft 15 on the end plate 14 side of the shaft 15, and the distal end of the coil 16 is connected to the commutator segment 17.

In an inner circumference of the motor case 11, two to four magnets 18 are arranged so as to face the coil 16 of the armature 12 with a predetermined interval. Further, as described above, the brushes 19 is arranged so as to always contact with the commutator segment 17 of the armature 12 on the end plate 14 located on the opening-side end portion of the motor case 11. Thus, the brush 19 and the commutator segment 17 always slide in a state of contacting with each other during a rotation of the armature 12

The brush 19 is made of a graphite-based material such as electric graphite; on the other hand, the commutator segment 17 is made of metal such as copper.

The brush 19 is connected with a lead wire 20, and the lead wire 20 extends from the interior of the motor case 11 to the outside via an insertion hole 36 of the motor case 11. An electricity is supplied to the commutator segment 17 from the lead wire 20 via the brushes 19, and thus, the coil 16 is energized. And then, a magnetic force generated by the coil 16 is repulsive to the magnets 18 of the motor case 11, so that the armature 12 will rotate.

The insertion hole 36 of the motor case 11 is provided with a packing 37 such as rubber so that the lead wire 20 and the motor case 11 are sealed. Further, an O ring 21 is provided on a portion where the motor case 11 and the side plate 14 are abutted against each other so that the motor case 11 and the side plate 14 are sealed. Furthermore, a seal 22 is interposed between the shaft 15 of the armature 12 and the side plate 14 so that the shaft 15 and the side plate 14 are sealed. Thus, the motor 10 is made watertight by the aforesaid packing, O ring 21 and seal 22.

Figure 3:
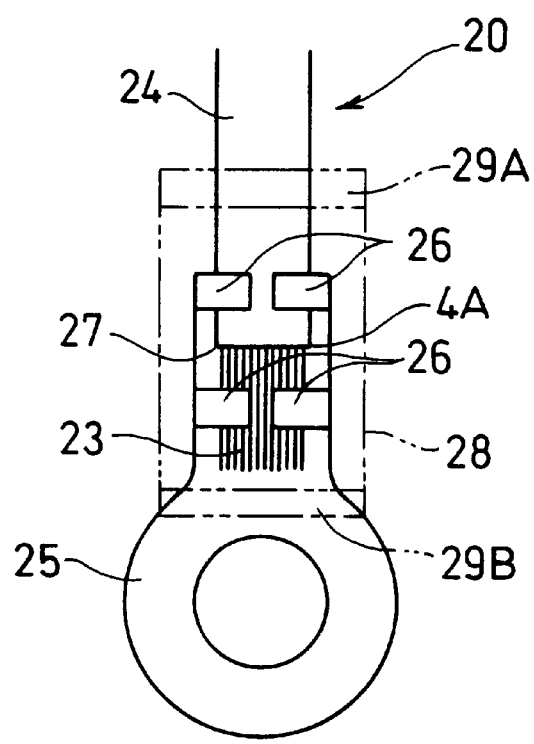
FIG. 3 is a front view showing an end portion of a lead wire of the motor shown in FIG. 1.

As shown in FIG. 3, the lead wire 20 comprises a core wire 23 and a cover 24 covering the core wire 23. A terminal 25 is fixed to an end portion of the core wire 23 by pressing. A pressing portion 26 of the terminal 25 is fixed to the lead wire 20 by soldering.

In the aforesaid sealed type motor 10, a clearance 4A between the core wire 23 and the cover 24 in the lead wire 20 is used as a vent path for make a communication of the interior of the motor case 11 with the outside. Air and water vapor or steam as a gas pass through the clearance 4. An opening end portion 27 of the cover 24 in the lead wire 20 functions as a vent hole for gas.

In the lead wire 20, a vent filter 28 is attached between the cover 24 and the terminal 25 so as to cover the opening end portion 27 of the cover 24. Opposite end portions 29A and 29B of the vent filter 28 are bonding portions bonded to each of the cover 24 and the terminal 25. The vent filter 28 is a vent waterproof film having micro holes which permits only gas such as air and water vapor to pass therethrough, but prevent liquid such as water from passing therethrough. More specifically, the vent filter 28 is a film using a porous fluorethylen-based resin such as Gortex® (trade name), a micro porous film mainly consisting of polypropylene and having micro holes of a maximum diameter of 0.3 μm, or the like.

Thus, during the operation of the motor 10, when the interior of the motor case 11 is heated by the rotation of the armature 12 and pressure in the motor case 11 rises air heated in the motor case 11 passes through the clearance 4A between the core wire 23 and the cover 24 in the lead wire 20. And then, the heated air passes through the vent filter 28 from the opening end portion 27 of the cover 24, and thus, is discharged to the outside of the motor 10. On the other hand, when the motor case 11 is cooled, since the pressure in the motor case 11 lowers, gas (air and water vapor) outside the motor 10 passes through the vent filter 28, and then, passes through the opening end portion 27 of the cover 24, and thus, is sucked into the motor case 11 via the clearance 4A of the lead wire 20.

The vent filter 28 permits water vapor to pass therethrough together with air. However, if humidity outside the motor 10 is about 4 to 10 g/m³ at absolute humidity, no condensation of water vapor is caused in the interior of the motor case 11. In the case where the humidity outside the motor 10 is higher than the aforesaid absolute humidity, the water vapor sucked into the motor 10 is condensed in the motor 10; however, water generated by the condensation is a very small amount. Therefore, when the motor 10 is actuated and the temperature of the motor case 11 rises, the water is again gasified into water vapor. Then, the water vapor is discharged to the outside via the clearance 4 and the vent filter 28; therefore, water does not collect within the motor 10.

According to the above embodiment, the following effects ① to ⑤ can be obtained.

① In order to cover the clearance 4A between the core wire 23 and the cover 24 of the lead wire 20, which is a vent path between the interior of the motor 10 and the outside, the vent filter 28, which allows only gas to pass therethrough, is attached to the lead wire 20 so as to cover the opening end portion 27 of the cover 24. Thus, even if the internal temperature of the motor 10 varies due to a heat generated by the rotation of the armature 12, it is possible to discharge the air in the motor case 11 to the outside via the clearance 4A of the lead wire 20 and the vent filter 28, and further, to suck an air of the outside into the motor case 11 via these vent filter 28 and clearance 4A of the lead wire 20. As a result, it is possible to preferably restrict a pressure variation due to a change in the internal temperature of the motor 10.

② In order to cover the clearance 4A between the core wire 23 and the cover 24 of the lead wire 20, which is a vent path between the interior of the motor 10 and the outside, the vent filter 28, which allows only gas to pass therethrough, is attached to the lead wire 20 so as to cover the opening end portion 27 of the cover 24. Thus, it is possible to prevent water outside the motor 10 from entering the interior of the motor 10. Therefore, it is possible to prevent abnormal abrasion between the commutator segment 17 and the brushes 19 caused in a maimer that water which collects in the motor case 11, and then, the commutator segment 17 and the brushes 19 are electrically decomposed due to the influence of water between these commutator 17 and brushes 19.

③ In order to cover the clearance 4A between the core wire 23 and the cover 24 of the lead wire 20, which is a vent path between the interior of the motor 10 and the outside, the vent filter 28, which allows only gas to pass therethrough, is attached to the lead wire 20 so as to cover the opening end portion 27 of the cover 24. Thus, it is possible to guide a water vapor which is a form of gas into the motor 10 together with air. Therefore, it is possible to prevent dust abrasion of the commutator segments 17 and the brushes 19 resulting from a lack of moisture and oxygen or the like.

④ The vent filter 28 is attached to the lead wire 20 so as to cover the opening end portion 27 of the cover 24 between the terminal 25 fixed to the end portion of the core wire 23 of the lead wire 20 and the cover 24. Therefore, it is possible to attach the vent filter 28 to the lead wire 20 without requiring special processing after the terminal 25 is fixed to the lead wire 20.

⑤ The vent filter 28 is a vent waterproofing film having micro holes.

The film is widely distributed in the market as a porous fluorethylen-based resin film (trade name: Gortex®), a resin film mainly consisting of polypropylene and having micro holes of a maximum diameter of 0.3 μm (trade name: micro porous film). Therefore, since these resin films are not special materials, it is possible to cheaply manufacture the vent film 28.

Figure 4:
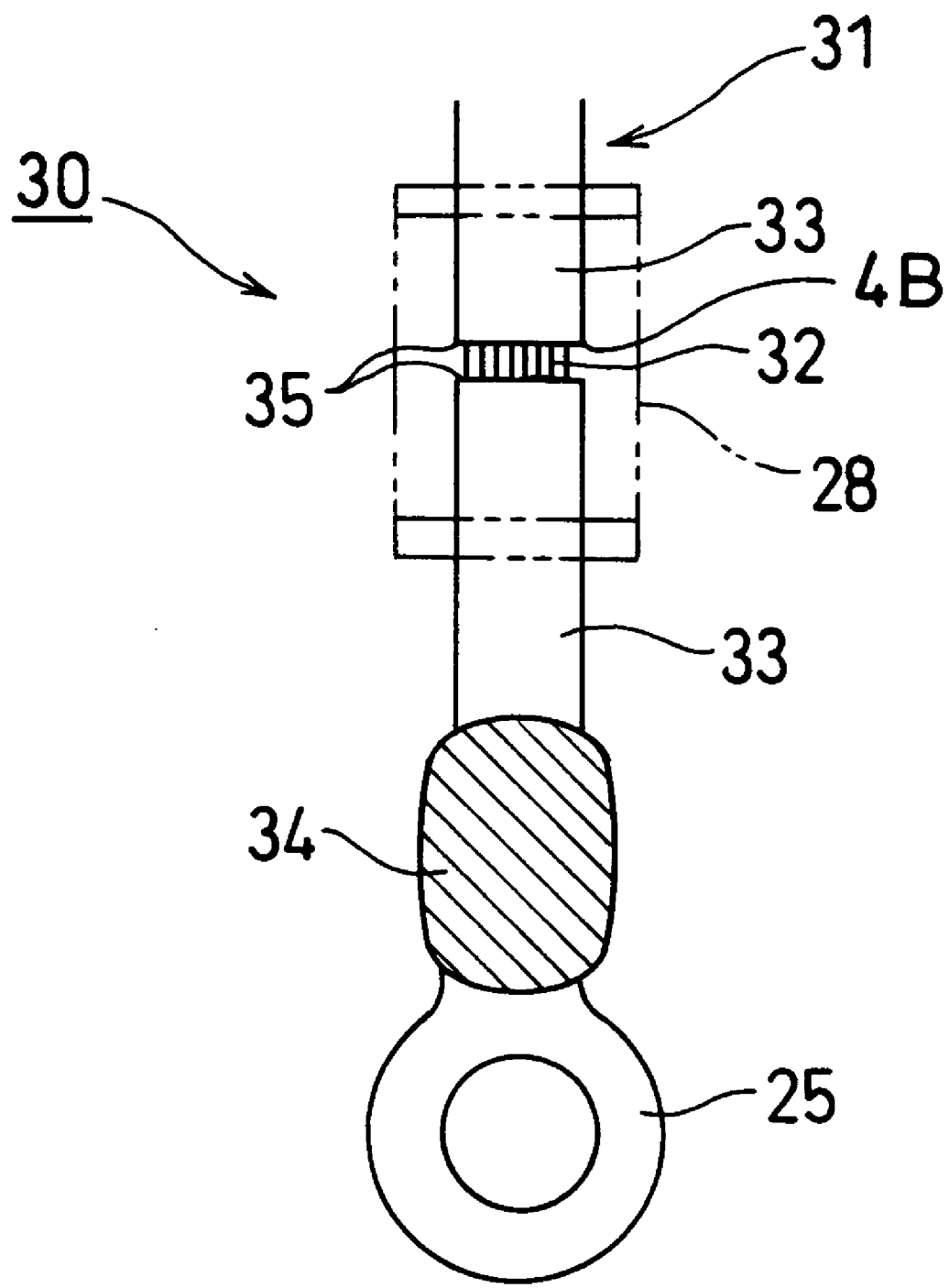
FIG. 4 is a front view corresponding to FIG. 3 of a motor to which a vent structure according to the second embodiment of the present invention is applied.
Figure 5:
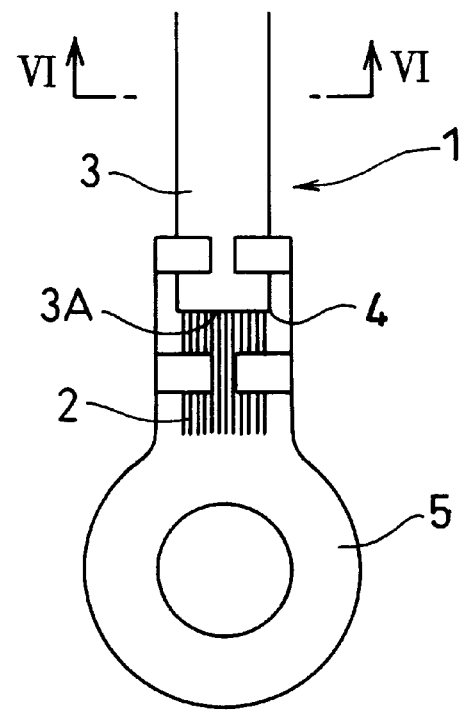
FIG. 5 is a front view showing an end portion of a lead wire in a prior art motor.
Figure 6:
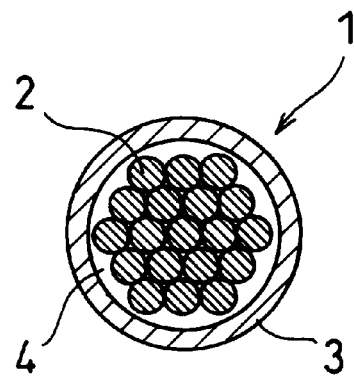
FIG. 6 is a cross-sectional view as taken along a line VI—VI of FIG. 5.

FIG. 4 is a front view corresponding to FIG. 3 of a motor to which a vent structure of a motor according to a second embodiment of the present invention is applied. In this second embodiment, in order to simplify the explanation, like reference numerals are used to designate the same components as the first embodiment.

In a motor 30 of this second embodiment, a lead wire 31 is constructed in a manner that a core wire 32 is covered with a cover 33. The terminal 25 is fixed to the core wire 32 by pressing. In this motor 30, the pressing portion 26 (see FIG. 3) of the terminal 25 is sealed by a bonding agent 34 or the like inclusive of the opening end portion 27 (see FIG. 3) of the cover 33. Further, the cover 33 is formed with a cover peeled portion 35 or a cover notched portion such as a hole at the midway portion thereof so that the core wire 32 is exposed. In the motor 30, the vent filter 28 is attached to the cover 33 of the lead wire 31 so as to cover the cover peeled portion 35.

Thus, even in the case of the motor 30, it is possible to pass only gas including air and water vapor through the motor 30 by means of the vent filter 28, and to prevent liquid such as water from passing therethrough. Therefore, the aforesaid effects ① to ③ and ⑤ can be obtained. Further, in the motor 30, the following effect ⑥ can be obtained.

⑥ The vent filter 28 is located so as to cover the peeled portion 35 of the cover 33 in the lead wire 31. Thus, even in the case where the caulking portion 26 of the terminal 25 fixed to the end portion of the core wire 32 of the lead wire 31 is sealed by the bonding agent 34, the vent filter 28 can be readily attached to the lead wire 31.

Moreover, in the aforesaid first and second embodiments, the clearance 4A between the core wire 23 and the cover 24 of the lead wire 20, and the clearance 4B between the core wire 32 and the cover 33 of the lead wire 31 have been used as a vent path which allows a gas to pass therethrough between the interior of the motors 10 and 30 and the outside. Also, the vent path is provided at other portion in the motors 10 and 30, and then, the vent filter 28 may be located so as to cover the vent path. For example, an opening is formed in the motor case 11, to form a vent path, and thus, the vent filter 28 may be attached to the motor case 11 so as to cover the opening.

As is evident from the above description, in the vent structure of a motor according to the present invention, it is possible to prevent abnormal abrasion and wear between the commutator segments and the brushes.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above but to include all possible embodiments which can be embodied within a scope encompassed and equivalents thereof with respect to the feature set out in the appended claims.

What is claimed is:

1. A vent structure for a watertight sealed motor, having a vent filter comprising vent waterproofing film having micro holes, which permits only gas to pass therethrough, located so as to cover a vent path to permit a passage of gas between the interior of the motor and the outside, wherein the vent path comprises a clearance between a core wire and a cover of a lead wire extending from a motor case, the vent filter being disposed between a terminal fixed to an end portion of the core wire by pressing and the cover so as to cover an opening end portion of the cover.

2. A vent structure for a watertight sealed motor, having a vent filter comprising vent waterproofing film having micro holes, which permits only gas to pass therethrough, located so as to cover a vent path to permit a passage of gas between the interior of the motor and the outside, wherein the vent path comprises a clearance between a core wire and a cover of a lead wire extending from a motor case, the vent filter being disposed so as to cover a cover notched portion which is formed in the cover so that the core wire is exposed.

3. A vent structure for a sealed watertight type motor, said motor including a case for sealingly covering said motor, said case having a sealed interior to be formed therein for communicating an interior of said case with the atmosphere, wherein a lead wire extends from said motor into the atmosphere through said interior hole of said casing, said lead wire formed of a core wire and a cover surrounding said core wire, said lead wire having a first end attached to said motor and a second end that includes thereon, a press-fitted electrical terminal, said vent structure comprising:

a vent path comprising a clearance between the core wire and wire cover of the lead wire, whereby said clearance forms an open portion at the terminal fitted to the second end of said lead wire, and a vent filter disposed between the electrical terminal and the surrounding cover of the core wire so as to cover the open portion of the wire cover at said second end of said lead wire, said vent filter comprising a waterproof film having micro holes therein which permit a gas to only pass from said motor case interior, outwardly through said vent path to the atmosphere.

4. The vent structure of claim 3, wherein the second end of the lead wire is sealed and the wire cover includes a notch therein, said notch establishing communication between said vent path and the atmosphere, and wherein the vent filter covers said notch.

* * * * *